US008250380B2

(12) United States Patent
Guyot et al.

(10) Patent No.: US 8,250,380 B2
(45) Date of Patent: Aug. 21, 2012

(54) IMPLEMENTING SECURE ERASE FOR SOLID STATE DRIVES (75) Inventors: Cyril Guyot, San Jose, CA (US); Zvonimir Z. Bandic, San Jose, CA (US); Yuval Cassuto, Sunnyvale, CA (US); Adam Michael Espeseth, Rochester, MN (US); Marco Sanvido, Belmont, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 365 days.

(21) Appl. No.: 12/640,730

(22) Filed: Dec. 17, 2009

(65) Prior Publication Data
US 2011/0154060 A1 Jun. 23, 2011

(51) Int. Cl.
H04L 9/14 (2006.01)
G06F 12/14 (2006.01)
G06F 12/02 (2006.01)
(52) U.S. Cl. ............................ 713/193; 380/44; 380/277
(58) Field of Classification Search .................. 713/193; 380/44, 277
See application file for complete search history.

(56) References Cited

U.S. PATENT DOCUMENTS

| 5,623,546 | A  | * | 4/1997  | Hardy et al. ................... 713/193 |
| 2002/0019935 | A1 | * | 2/2002  | Andrew et al. ............... 713/165 |
| 2003/0084290 | A1 | * | 5/2003  | Murty et al. .................... 713/168 |
| 2003/0110382 | A1 | * | 6/2003  | Leporini et al. .............. 713/172 |
| 2003/0174840 | A1 | * | 9/2003  | Bogan ........................... 380/277 |
| 2005/0138374 | A1 | * | 6/2005  | Zheng et al. ................... 713/166 |
| 2008/0065905 | A1 | * | 3/2008  | Salessi ........................... 713/193 |
| 2008/0183953 | A1 | * | 7/2008  | Flynn et al. ................... 711/103 |
| 2008/0282027 | A1 | * | 11/2008 | Chen et al. .................... 711/104 |
| 2008/0313453 | A1 | * | 12/2008 | Booth et al. ...................... 713/2 |
| 2009/0043831 | A1 | * | 2/2009  | Antonopoulos et al. ...... 707/205 |
| 2009/0044003 | A1 | * | 2/2009  | Berthiaume et al. .......... 713/100 |
| 2009/0094406 | A1 | * | 4/2009  | Ashwood ....................... 711/103 |
| 2009/0110191 | A1 | * | 4/2009  | Sanvido et al. .................. 380/44 |
| 2010/0154053 | A1 | * | 6/2010  | Dodgson et al. ................ 726/19 |
| 2010/0229005 | A1 | * | 9/2010  | Herman et al. ............... 713/193 |
| 2011/0035813 | A1 | * | 2/2011  | Trantham ........................ 726/34 |
| 2011/0041039 | A1 | * | 2/2011  | Harari et al. .................. 714/773 |
| 2011/0085657 | A1 | * | 4/2011  | Matthews, Jr. .................. 380/28 |
| 2011/0087896 | A1 | * | 4/2011  | Thom et al. ................... 713/193 |

OTHER PUBLICATIONS

Davis, John D. and Lintao Zhang. "FRP: A Nonvolatile Memory Research Platform Targeting NAND Flash", Mar. 2009.*
"Solid-State Disks Offer 'Fast Erase' Features", http://www.allbusiness.com/print/11777107-1-22eeq.html, 4 pages.
"Press Release NEW VPX3-FDM Flash Storage Module Released_ Curtiss Wright Control Computing", http://www.cwcembedded.com/0/62/661.html, 2 pages.

* cited by examiner

Primary Examiner — Michael Simitoski
(74) Attorney, Agent, or Firm — Joan Pennington (57) ABSTRACT A method and apparatus are provided for implementing secure erase for solid state drives (SSDs). An encryption key is used to encrypt data being written to SSD. A controller identifies a key storage option, and responsive to the identified key storage option, stores a key for data encryption and decryption. The controller deletes the key within the SSD responsive to the identified key storage option, ensuring that once the key is deleted, the key is not recoverable and data is effectively erased.

15 Claims, 7 Drawing Sheets

IMPLEMENTING SECURE ERASE FOR SOLID STATE DRIVES

FIELD OF THE INVENTION

The present invention relates generally to the data storage field, and more particularly, relates to a method and apparatus for implementing secure erase for solid state drives (SSDs).

DESCRIPTION OF THE RELATED ART

United States Patent Application 2009/0119191, application Ser. No. 11/923,123 filed Oct. 24, 2007 to Marco Sanvido et al., and assigned to the present assignee discloses techniques for encrypting data stored on data storage devices using an intermediate key. A data storage device encrypts data stored in non-volatile memory using a bulk encryption key. The data storage device uses a key derivation function to generate an initial encryption key. The data storage device then wraps an intermediate encryption key with the initial encryption key and stores the wrapped intermediate key in the non-volatile memory. The data storage device wraps the bulk encryption key with the intermediate encryption key and stores the wrapped bulk encryption key in the non-volatile memory. The data storage device can unwrap the wrapped intermediate key to generate the intermediate encryption key using the initial encryption key. The data storage device can unwrap the wrapped bulk encryption key to generate the bulk encryption key using the intermediate encryption key. The data storage device decrypts data stored in the non-volatile memory using the bulk encryption key. Bulk encrypting data prevents hard disk drives (HDDs) with user data from being disclosed to unauthorized individuals. Bulk encryption can also be used to enable a fast secure erase of data on a HDD, or to simplify the redeployment and decommissioning of used systems.

In solid state drives (SSDs), extra memory cells beyond what is allocated to the file system are used for wear leveling. The wear-leveling feature distributes data across that larger area to extend the life of the SSD. These cells may be swapped in and out of the area used by the file system.

It is desirable to use bulk encryption to simplify the erasure task for SSDs. A need exists to provide effective, secure and efficient secure erase functionality for solid state drives (SSDs).

SUMMARY OF THE INVENTION

Aspects of the present invention are to provide a method and apparatus for implementing secure erase for solid state drives (SSDs). Other important aspects of the present invention are to provide such method and apparatus substantially without negative effect and that overcome some of the disadvantages of prior art arrangements.

In brief, a method and apparatus are provided for implementing secure erase for solid state drives (SSDs). An encryption key is used to encrypt data being written to SSD. A controller identifies a key storage option, and responsive to the identified key storage option, stores a key for data encryption and decryption. The controller responsive to the identified key storage option, deletes the key within the SSD and data is effectively erased.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

Figure 1:
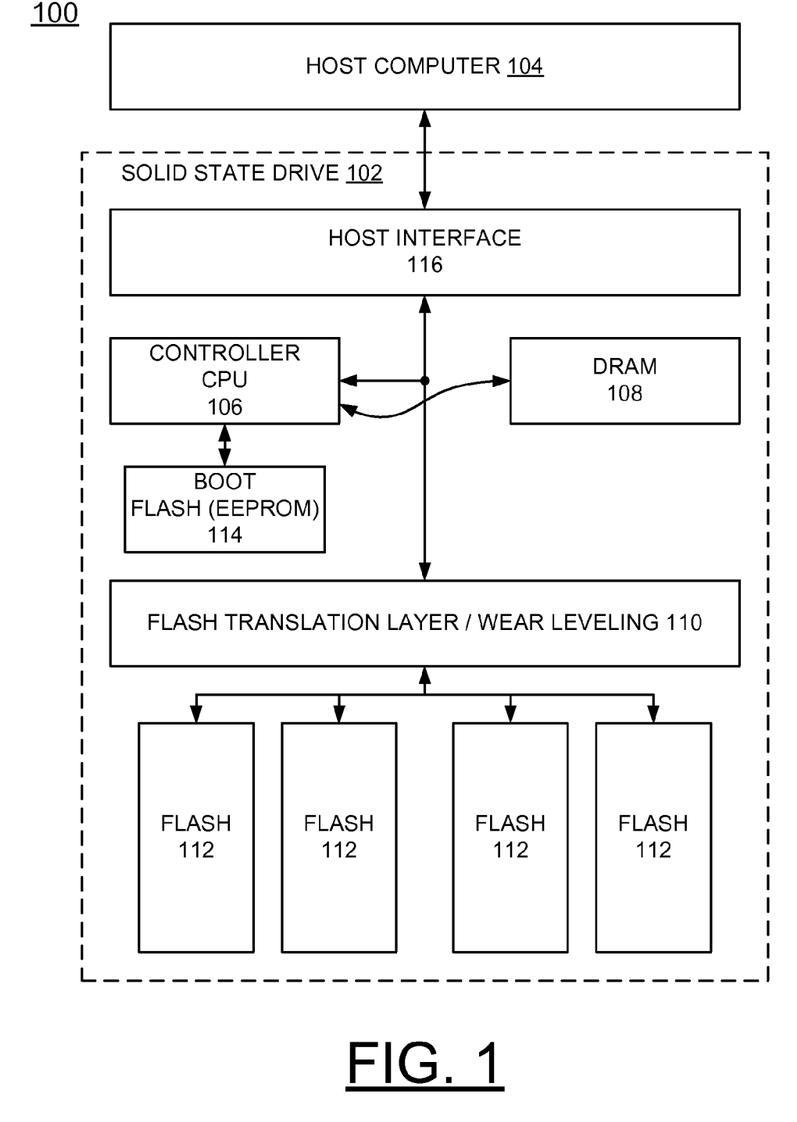
FIG. 1 is a block diagram representation illustrating a system for implementing secure erase methods for solid state drives (SSDs) in accordance with an embodiment of the invention.

Having reference now to the drawings, in FIG. 1, there is shown a system for implementing secure erase methods for solid state drives (SSDs) generally designated by the reference character 100 in accordance with an embodiment of the invention. System 100 includes a solid state drive 102 and a host computer 104. SSD 102 includes a controller 106 coupled to a dynamic random access memory (DRAM) 108, and a flash translation layer/wear leveling block 110. SSD 102 includes a plurality of flash blocks 112 coupled to the flash translation layer/wear leveling functional block 110 and a boot flash 114 coupled to the controller 106, such as a NOR-flash or electrically erasable programmable read only memory (EEPROM). SSD 102 includes a host interface 116 coupled between the host computer 104, and the controller 106 and the flash translation layer/wear leveling functional block 110.

SSD 102 implements secure erase, ensuring that once a key used for bulk encryption is deleted, the key is not recoverable in accordance with embodiments of the invention. The controller 106 of SSD 102 includes firmware that is given direct access to erase flash blocks 112. The firmware of controller 106 of SSD 102 is given information on the flash translation layer/wear leveling functional block 110, for searching and deletion and overwriting keys in the flash block 112, and for garbage collection to delete duplicate keys created from wear-leveling.

Figure 2:
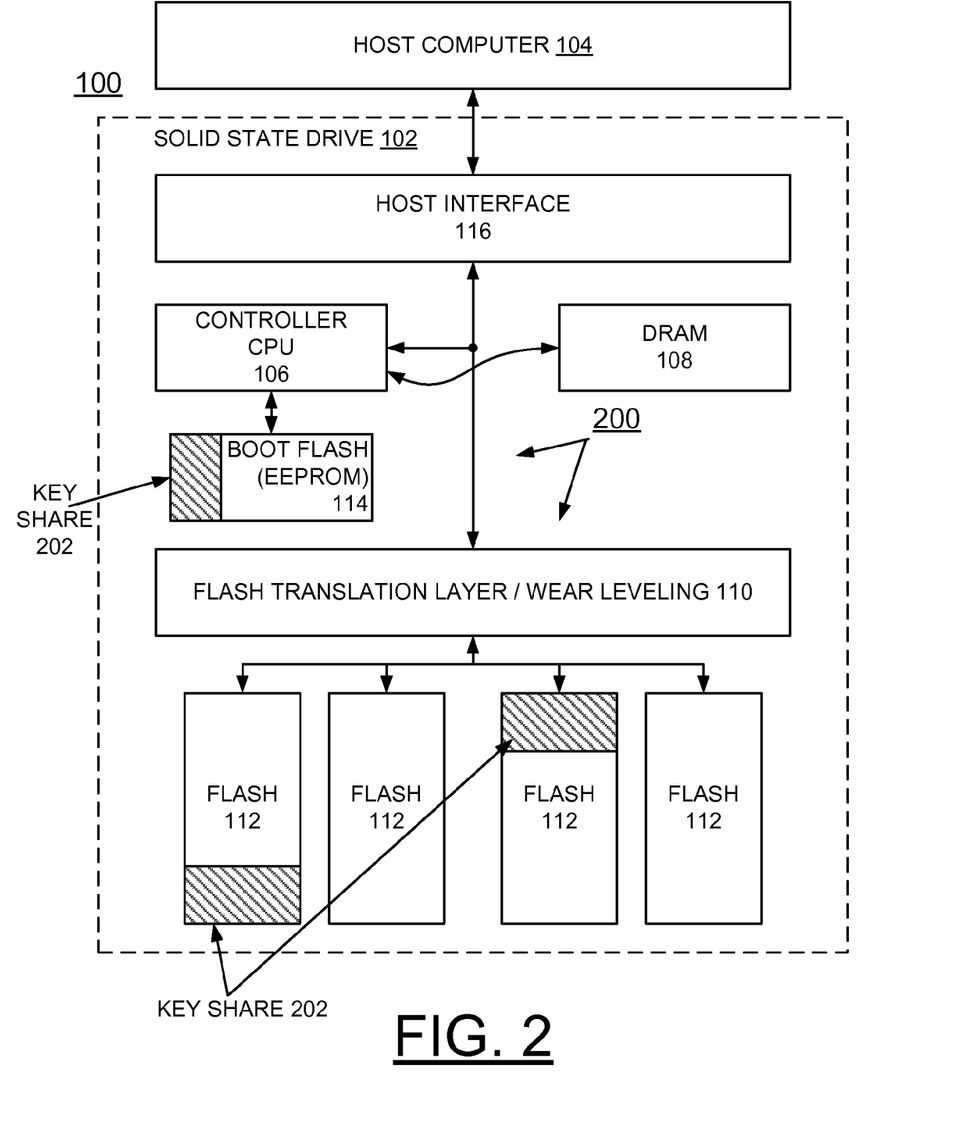
FIGS. 2, 3A, and 3B illustrate secure erase key storage operations in accordance with embodiments of the invention.
Figure 3A:
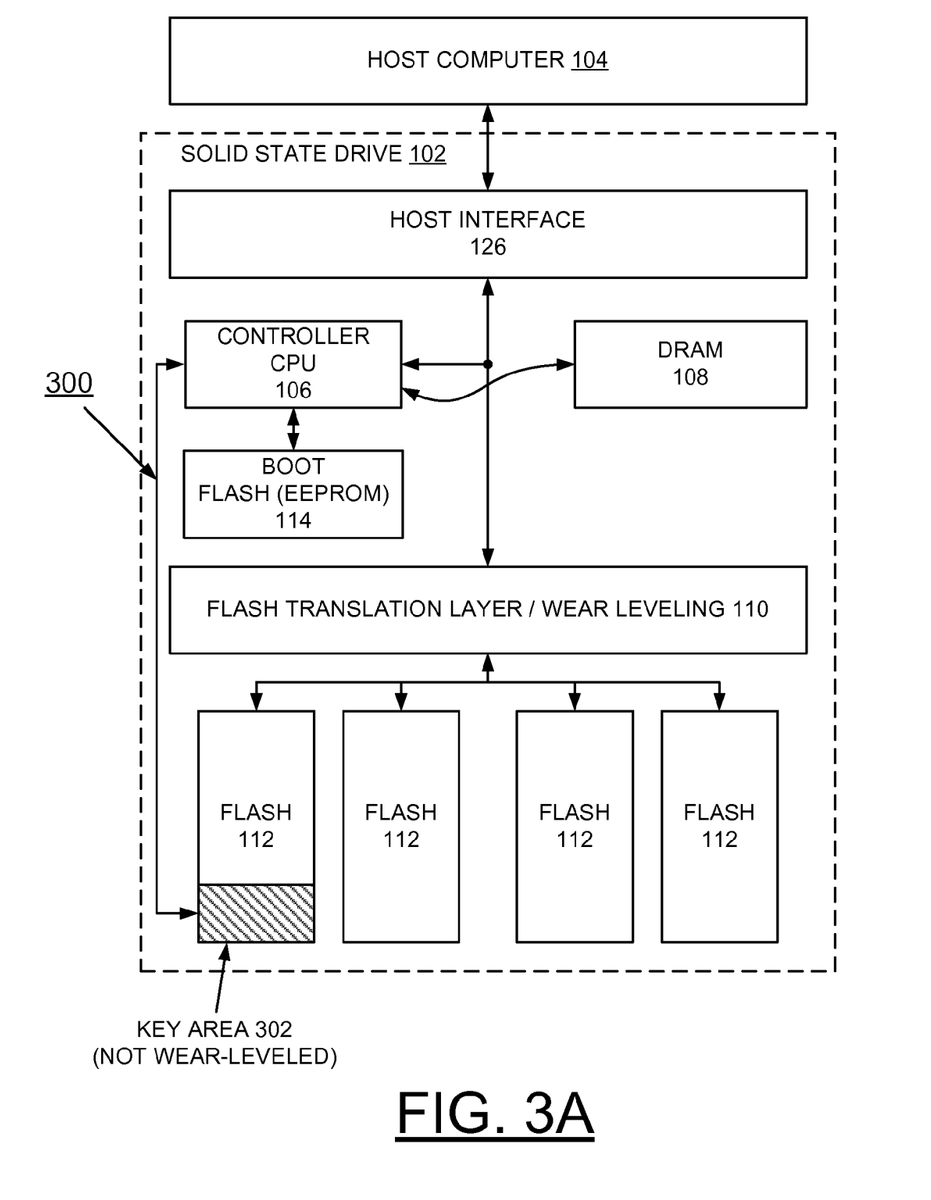
Figure 3B:
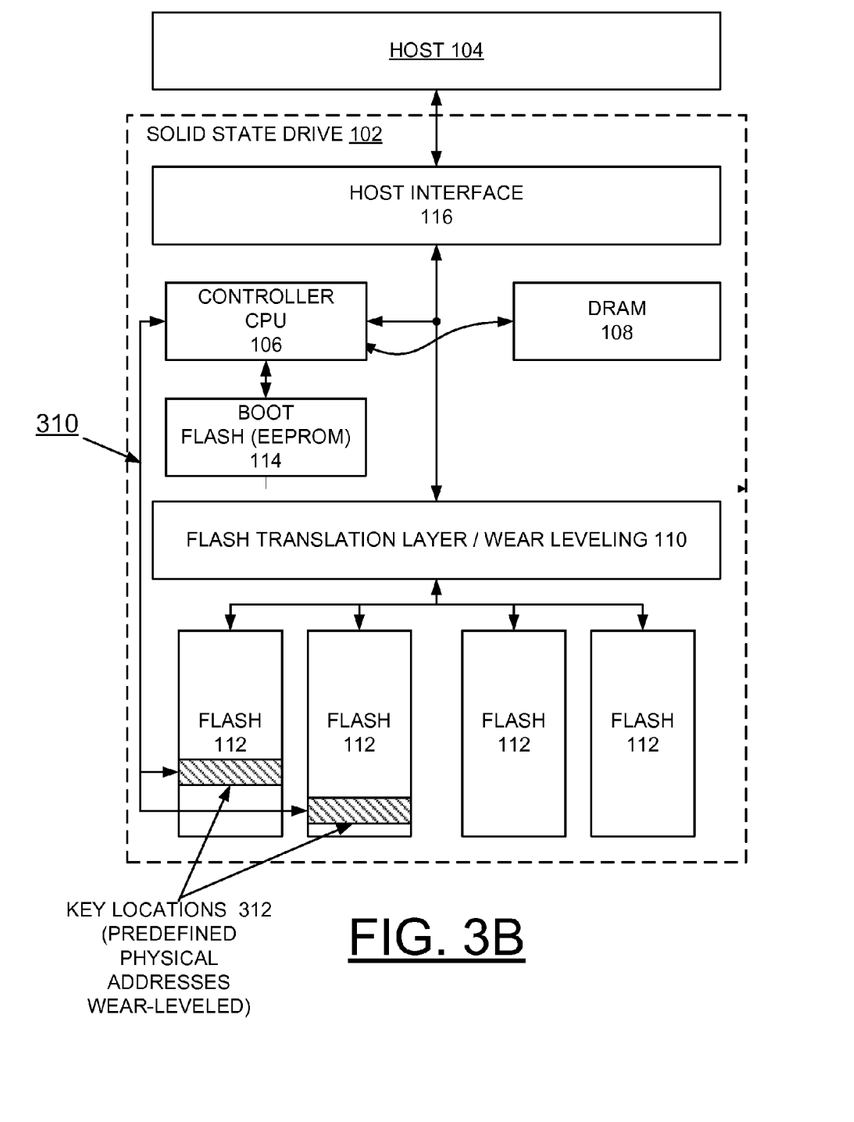

Referring now to FIGS. 2, 3A, and 3B, there are shown secure erase key storage operations in accordance with embodiments of the invention.

FIG. 2 illustrates the system 100 with a split key embodiment of SSD 102 in accordance with the invention. A key is distributed or split between the NOR-flash 114, and the flash locks 112. A key distribution generally designated by the reference character 200 in accordance with an embodiment of the invention includes a key share 202 stored in the NOR-flash or EEPROM 114, and other key shares 202 stored the flash blocks 112. The size of the key chunk or share 202 stored in the NOR-flash 114 can be smaller that a full key bundle, for example, 128 bit instead of 1 Kb.

Erasing the key with the key distribution 200 or split key storage option 200 of FIG. 2 can be handled by only erasing the NOR flash part 202 and recalculating all the other key shares 202 of the flash blocks 112 for effectively and securely erasing data.

FIGS. 3A, and 3B respectively illustrate another embodiment of SSD 102 of system 100 with a key storage area of flash that is not wear-leveled and the key stored in predictable location/blocks during wear-leveling in accordance with the invention.

In FIG. 3A, a key storage operation of controller 106 generally designated by the reference character 300 in accordance with the embodiment of the invention includes a key stored in a key area 302 of the flash block 112 that is not wear-leveled. The key area 302 used for key storage includes blocks with guaranteed reliability. The firmware of controller 106 and the flash translation layer/wear leveling functional block 110 handle wear-leveling.

In FIG. 3B, a key storage operation of controller 106 generally designated by the reference character 310 in accordance with an embodiment of the invention includes a key stored in a plurality of key locations 312 of the flash block 112 that include predefined physical addresses during wear-leveling. The controller 106 keeps track of the key locations 312 used for key storage. The firmware of controller 106 and the flash translation layer/wear leveling functional block 110 handle wear-leveling and enable erasing all copies of a key. A simple example where it is generally easy for the controller 106 to keep track of where previous versions of the stored key follows:

Key A stored on all physical addresses with same residue A mod p.

Host 104 erases block A, controller 106 erases all blocks with physical addresses N, such that N mod p=A.

When the key needs to be erased, the firmware of controller 106 erases the key and requests garbage collection so that all the locations containing the key and that were not reused are erased for effectively and securely erasing data.

Figure 4A:
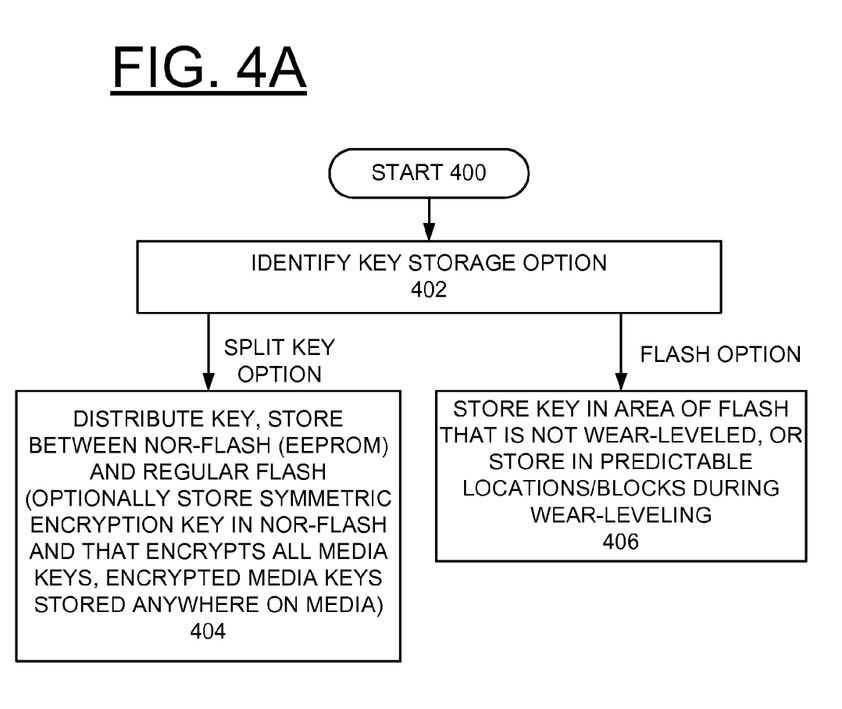
FIGS. 4A, and 4B are flow charts illustrating example operations of the system of FIG. 1 in accordance with secure erase embodiments of the invention.
Figure 4B:
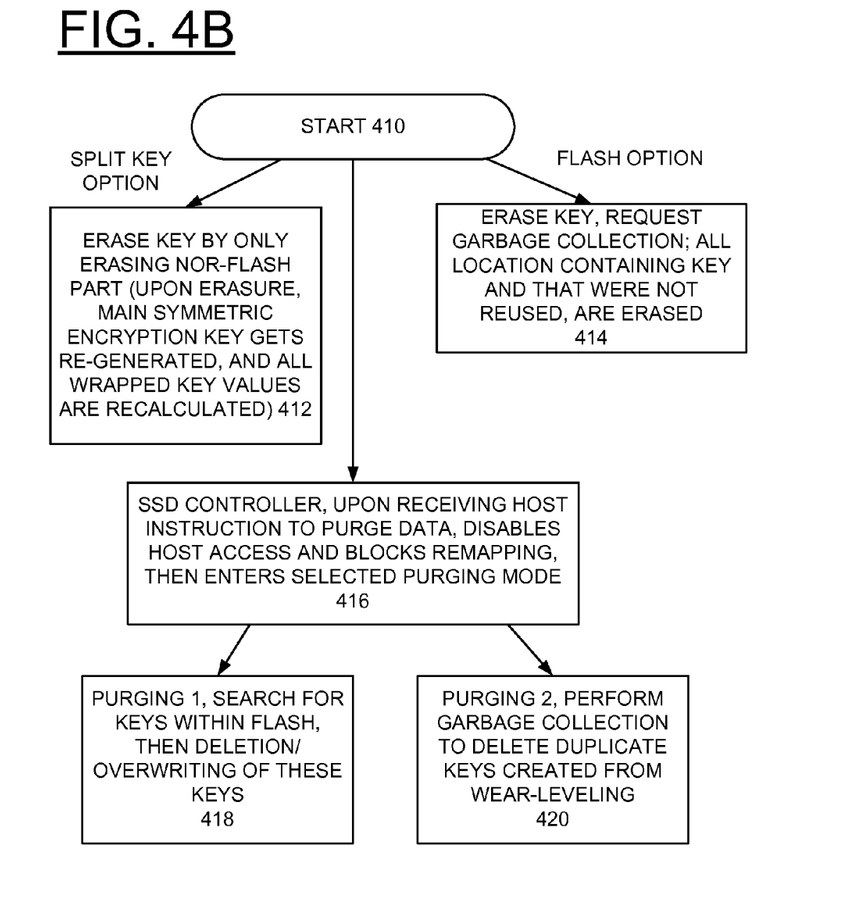

FIGS. 4A, and 4B are flow charts illustrating example operations of the system 100 of FIG. 1 in accordance with secure erase embodiments of the invention.

In FIG. 4A, example operations starting at a block 400, first a key storage option is identified as indicated at a block 402. When the split key option, such as illustrated in FIG. 2, is identified, the key is distributed between the NOR-flash 114 and the regular flash blocks 112 as indicated at a block 404. If information theoretic security is required, then all the shares need to be at least as large as the key. A simpler and more efficient solution is to relax the information-theoretic requirement, and allow for computational complexity assumptions. Then it is sufficient to have one symmetric encryption key stored in the NOR-flash 114 and this one symmetric encryption key encrypts all the media keys. Those encrypted media keys can be stored anywhere on the media flash blocks 112 at block 404.

As indicated at a block 406 when the flash option, such as illustrated in FIGS. 3A and 3B, is identified, the key is stored in area, such as key area 302 in FIG. 3A that is not wear-leveled, or the key stored in the predictable key locations 312 of the flash block 112 that include predefined physical addresses during wear-leveling.

In FIG. 4B, there are shown example operations starting at a block 410, with the split key option, such as illustrated in FIG. 2, the key is erased by only erasing the NOR-flash part for effectively and securely erasing data as indicated at a block 412. Optionally with the relaxed information-theoretic requirement upon erasure, the one main symmetric encryption key gets re-generated and the wrapped key values are recalculated at block 412 for effectively and securely erasing data.

As indicated at a block 414 with the flash option, such as illustrated in FIGS. 3A and 3B, when the key needs to be erased, the firmware of controller 106 requests garbage collection and erases the key by erasing all the locations containing the key that were not reused, effectively and securely erasing data.

As indicated at a block 416, another embodiment of the invention includes the controller 106, upon receiving a host instruction to purge date, first disabling host access and blocking remapping, then entering a selected purging mode. The purging mode can employ operations for effectively and securely erasing data as indicated at a block 418, or as indicated at a block 420 or both operations at blocks 418, and 420. Searching for keys within the flash, then deletion/overwriting of the keys are performed at block 418. At block 420, garbage collection is performed to delete duplicate keys created from wear-leveling.

Figure 5:
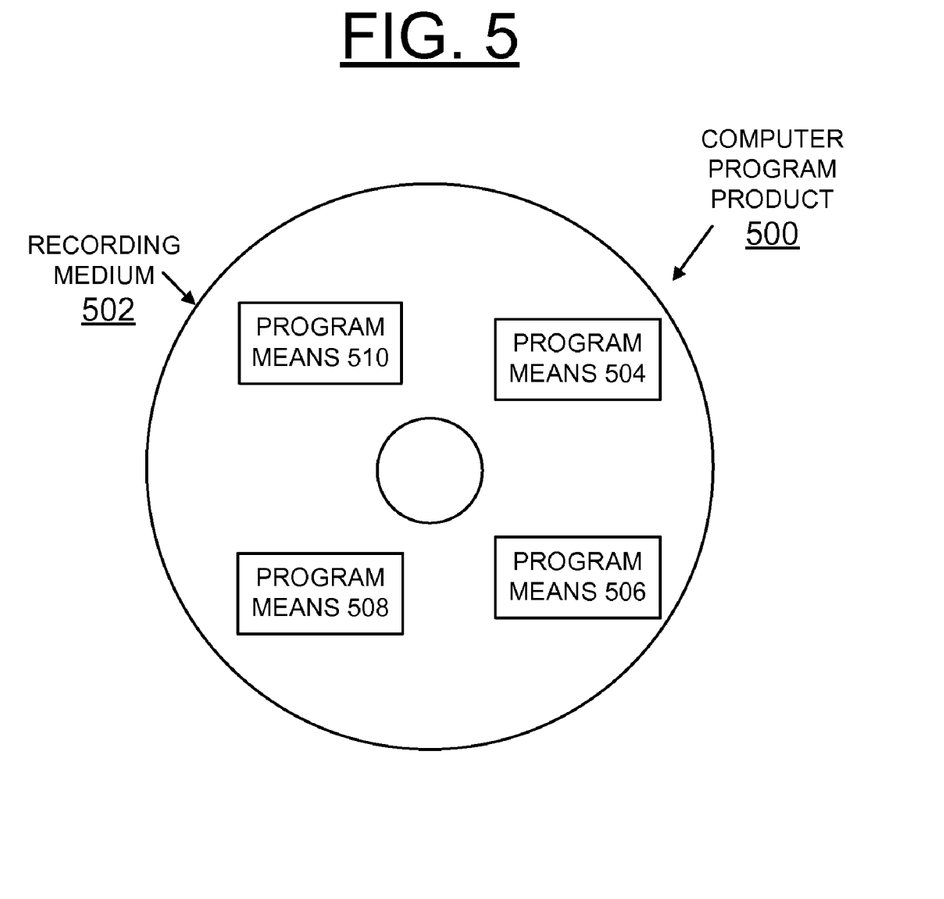
FIG. 5 is a block diagram illustrating a computer program product in accordance with embodiments of the invention.

Referring now to FIG. 5, an article of manufacture or a computer program product 500 of the invention is illustrated. The computer program product 500 includes a computer readable recording medium 502, such as, a floppy disk, a high capacity read only memory in the form of an optically read compact disk or CD-ROM, a tape, or another similar computer program product. Computer readable recording medium 502 stores program means or control code 504, 506, 508, 510 on the medium 502 for carrying out the methods for implementing secure erase of the embodiments of the invention in the system 100 of FIG. 1.

A sequence of program instructions or a logical assembly of one or more interrelated modules defined by the recorded program means or control code 504, 506, 508, 510, direct SSD controller 106 of the system 100 for implementing secure erase of the embodiments of the invention.

While the present invention has been described with reference to the details of the embodiments of the invention shown in the drawing, these details are not intended to limit the scope of the invention as claimed in the appended claims.

What is claimed is:

1. A method for implementing secure erase for solid state drives (SSDs) comprising:
   using an encryption key to encrypt data being written to SSD;
   identifying a key storage option,
   responsive to the identified key storage option, storing a key within the SSD for data encryption and decryption; and
   deleting the stored key using selected ones of a plurality of predefined operations responsive to the identified key storage option for effectively and securely erasing data, by searching for keys within flash blocks and erasing the key in all locations storing the key to delete keys created from wear-leveling.

2. The method for implementing secure erase as recited in claim 1 wherein identifying a key storage option includes identifying a flash key storage option.

3. The method for implementing secure erase as recited in claim 2 wherein responsive to the identified flash key storage option, storing a key within the SSD for data encryption and decryption includes storing a key within an area of a flash block that is not wear-leveled.

4. The method for implementing secure erase as recited in claim 3 includes storing a key within predictable locations of a flash block during wear-leveling.

5. The method for implementing secure erase as recited in claim 1 includes receiving a host instruction to purge data, disabling host access and disabling block remapping.

6. The method for implementing secure erase as recited in claim 5 includes entering a selected purge mode.

7. The method for implementing secure erase as recited in claim 6 wherein entering a selected purge mode includes searching for keys within flash blocks, and performing deletion/overwriting of located keys.

8. A method for implementing secure erase for solid state drives (SSDs) comprising:

using an encryption key to encrypt data being written to SSD;

identifying a key storage option, responsive to the identified key storage option, storing a key within the SSD for data encryption and decryption;

deleting the stored key responsive to the identified key storage option for effectively erasing data;

receiving a host instruction to purge data, disabling host access and disabling block remapping; and entering a selected purge mode including erasing the key in all locations storing the key to delete keys created from wear-leveling.

9. The method for implementing secure erase as recited in claim 8 wherein identifying a key storage option includes identifying a split key storage option.

10. The method for implementing secure erase as recited in claim 9 wherein responsive to the identified split key storage option, storing a key within the SSD for data encryption and decryption includes storing a key share within a NOR-flash, and storing a key share within a flash block.

11. The method for implementing secure erase as recited in claim 10 wherein deleting the stored key for effectively erasing data includes erasing the key share stored in the NOR-flash.

12. An apparatus for implementing secure erase for solid state drives (SSDs) comprising:

a controller using an encryption key to encrypt data being written to SSD;

said controller identifying a key storage option, said controller responsive to the identified key storage option, storing a key within the SSD for data encryption and decryption;

said controller responsive to the identified key storage option and said controller responsive to receiving a host instruction to purge data, disabling host access and disabling block remapping, and said controller deleting the stored key for effectively erasing data; and said controller performing a selected purge mode including said controller searching for keys within flash blocks, and performing deletion/overwriting of located keys, and said controller erasing the key in all locations storing the key to delete keys created from wear-leveling.

13. The apparatus as recited in claim 12, includes control code stored on a computer readable medium, and wherein said controller uses said control code for implementing secure erase.

14. The apparatus as recited in claim 12, wherein said controller responsive to identifying a split key storage option, stores a key share within a NOR-flash, and stores a key share within a flash block, and said controller deleting the stored key for effectively erasing data includes said controller erasing said key share stored in said NOR-flash.

15. The apparatus as recited in claim 12, wherein responsive to identifying a flash key storage option, said controller stores a key within an area of a flash block that is not wear-leveled, said controller stores a key within predictable locations of a flash block during wear-leveling, and said controller deleting the stored key for effectively erasing data includes said controller erasing the key stored in all locations storing the key.

* * * * *